(12) United States Patent
Obaishi (10) Patent No.: US 12,541,276 B2
(45) Date of Patent: Feb. 3, 2026

(54) DISPLAY SYSTEM AND DISPLAY METHOD

(71) Applicant: RAKUTEN GROUP, INC., Tokyo (JP)

(72) Inventor: Yukiyo Obaishi, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 19/092,111

(22) Filed: Mar. 27, 2025

(65) Prior Publication Data
US 2025/0306834 A1 Oct. 2, 2025

(30) Foreign Application Priority Data

Mar. 29, 2024 (JP) .................. 2024-056926

(51) Int. Cl.
| | |
|---|---|
| *G06F 3/048* | (2013.01) |
| *G06F 3/14* | (2006.01) |
| *G06F 16/248* | (2019.01) |
| *G06F 21/31* | (2013.01) |
| *G06Q 10/063* | (2023.01) |

(Continued)

(52) U.S. Cl.
CPC ............ *G06F 3/048* (2013.01); *G06F 16/248* (2019.01); *G06F 21/316* (2013.01); *G06Q 10/063* (2013.01); *H04L 67/535* (2022.05); *H04N 21/44222* (2013.01); *G06F 3/14* (2013.01); *G06F 16/2425* (2019.01); *G06F 16/2428* (2019.01); *G06F 2206/1008* (2013.01); *G06Q 10/063114* (2013.01); *G06Q 50/10* (2013.01)

(58) Field of Classification Search
CPC ...... G06F 3/048; G06F 16/248; G06F 21/316; G06F 3/14; G06F 16/2425; G06F 16/2428; G06F 2206/1008; G06Q 10/063; G06Q 10/063114; G06Q 50/10; H04L 67/535; H04N 21/44222

See application file for complete search history.

(56) References Cited

U.S. PATENT DOCUMENTS

| | | | | |
|---|---|---|---|---|
| 6,314,386 B1 * | 11/2001 | Uemura | ................ | H04L 67/535 |
| | | | | 702/186 |
| 8,438,177 B2 * | 5/2013 | Paulsen | ................... | G06F 16/26 |
| | | | | 707/759 |

(Continued)

FOREIGN PATENT DOCUMENTS

JP H11-120037 A 4/1999

*Primary Examiner* — Michael J Jansen, II
(74) *Attorney, Agent, or Firm* — Sughrue Mion, PLLC (57) ABSTRACT

A display system includes processors and memories storing computer program code and display data. The processors read the program code and operate as instructed by the program code. The program code includes display code configured to cause the processors to display a path diagram in a display area. The path diagram includes nodes respectively corresponding to services. The nodes include a first node representing a first service that serves as a reference among the services and second nodes respectively representing second services, other than the first service, among the services. An overlap ratio is a ratio of the number of users of one of two of the second services to the number of users who use both of the two second services. The program code includes change code configured to cause the processors to change a display mode of the second nodes in proportion to the overlap ratio.

9 Claims, 3 Drawing Sheets

(51) Int. Cl.
*H04L 67/50* (2022.01)
*H04N 21/442* (2011.01)
*G06F 16/242* (2019.01)
*G06Q 10/0631* (2023.01)
*G06Q 50/10* (2012.01)

(56) References Cited

U.S. PATENT DOCUMENTS

| | | | |
|---|---|---|---|
| 10,635,682 B2 * | 4/2020 | Parthasarathy | G06F 16/2358 |
| 10,977,363 B2 * | 4/2021 | Leitner | G06F 21/554 |
| 2014/0157142 A1 * | 6/2014 | Heinrich | G06F 3/0412 |
| | | | 715/744 |
| 2020/0273040 A1 * | 8/2020 | Novick | G06Q 20/4016 |
| 2025/0306834 A1 * | 10/2025 | Obaishi | G06F 3/14 |

* cited by examiner

DISPLAY SYSTEM AND DISPLAY METHOD

CROSS-REFERENCE TO RELATED APPLICATIONS

This application is based upon and claims the benefit of priority from Japanese Patent Application No. 2024-056926, filed on Mar. 29, 2024, the entire contents of which are incorporated herein by reference.

BACKGROUND

1. Field

The present disclosure relates to a display system and a display method.

2. Description of Related Art

The display method disclosed in Japanese Laid-Open Patent Publication No. 11-120037 displays the flow of movement of users in a website based on access log information. The flow of movement is represented by connecting the content files in the website to each other with arrows.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

When multiple services that are available using shared user identification information are provided, it may be desirable to visually understand user transitions between these services.

An aspect of the present disclosure provides a display system that displays transitions of users between services accessible using shared user identification information. The display system includes one or more processors and one or more memories that store display data. The display data is used to display a path diagram in a display area. The path diagram includes nodes respectively corresponding to the services and links representing the transitions of the users between the services. The links each connect the nodes to each other. The nodes include a first node representing a first service that serves as a reference among the services and second nodes respectively representing second services, other than the first service, among the services. An overlap ratio is a ratio of the number of users of one of two of the second services to the number of users who use both of the two second services. The one or more processors are configured to, based on the display data, execute displaying the path diagram in the display area and changing a display mode of the second nodes in proportion to the overlap ratio.

An aspect of the present disclosure provides a display system that displays transitions of users between services accessible using shared user identification information. The display system includes one or more processors and one or more memories that store display data. The display data is used to display a path diagram in a display area. The path diagram includes nodes respectively corresponding to the services and links representing the transitions of the users between the services. The links each connect the nodes to each other. The nodes include a first node representing a first service that serves as a reference among the services and second nodes respectively representing second services, other than the first service, among the services. The one or more processors are configured to, based on the display data, execute displaying the path diagram in the display area and displaying the nodes in the display area depending on the first service selected from the services.

An aspect of the present disclosure provides a display method for displaying transitions of users between services accessible using shared user identification information. The display method includes causing a computer to display a path diagram in a display area. The path diagram includes nodes respectively corresponding to the services and links representing the transitions of the users between the services. The links each connect the nodes to each other. The nodes include a first node representing a first service that serves as a reference among the services and second nodes respectively representing second services, other than the first service, among the services. An overlap ratio is a ratio of the number of users of one of two of the second services to the number of users who use both of the two second services. The display method includes causing the computer to change a display mode of the second nodes in proportion to the overlap ratio.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An example of a display system and display method will now be described with reference to FIGS. 1 to 4. The present disclosure is not limited to those exemplified and is shown by the scope of the claims. It is intended to include all modifications within the meaning and range equivalent to the scope of the claims.

Figure 1:
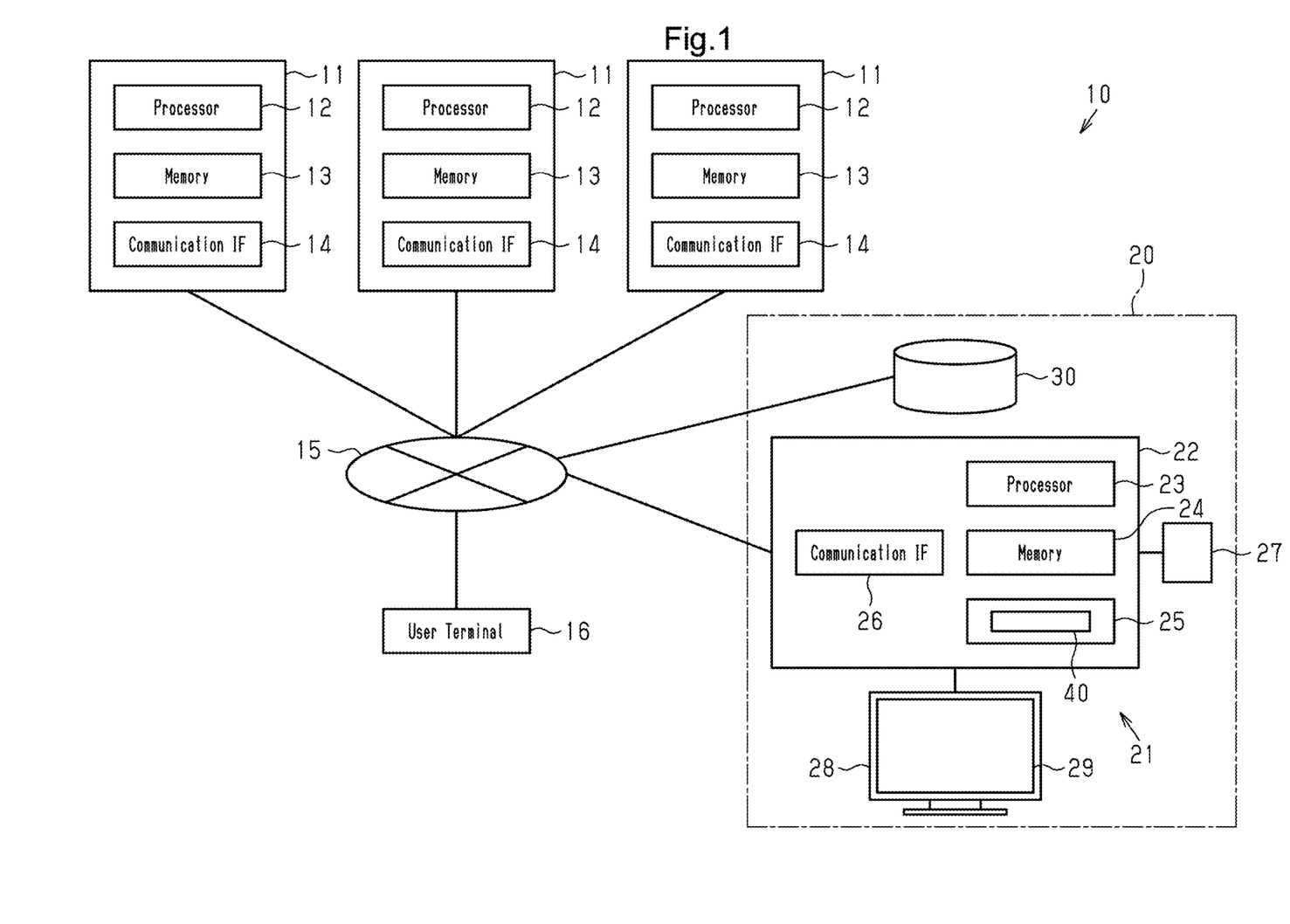
FIG. 1 is a diagram illustrating the schematic configuration of a display system according to the present embodiment.

As shown in FIG. 1, the service providing system 10 includes one or more web servers 11. Each web server 11 provides one or more services to users. For example, the web server 11 provides services to a user terminal 16 via a network 15 in the form of a website or application. When providing multiple services to users, one web server 11 may provide multiple services, or each of multiple web servers 11 may provide a single service.

The multiple services may include electronic commerce (EC) services, travel reservation services, credit card services (post-payment settlement services), loyalty card services, auction services, web search services, research services, golf course reservation services, mobile payment services, settlement services, communication services, electronic book services, financial services, flea market services, securities trading services, electronic payment services, reward granting services, and clothing sales services.

Multiple services can be used with shared user identification information. User identification information is used to identify a user. User identification information may include an ID that is individually assigned for each user and a password. Multiple services may be a single group of services provided by the same business entity.

Multiple services may be provided as different websites or as different applications. Whether websites are different from each other can be determined by a third-level domain. Webpages that share the same third-level domain belongs to an independent website. In this manner, multiple services are provided as at least two of two or more different websites or two or more different applications.

The service providing system 10 may include a database that stores registered user identification information. The database may be maintained by the web server 11, or may be stored in a device accessible by the web server 11. Users each input user identification information into the user terminal 16. The user identification information is sent to the web server 11. The web server 11 executes user authentication by comparing the registered user identification information with the user identification information obtained from the user terminal 16. When user authentication is executed, the user is granted permission to use the service.

Each web server 11 may be a computer that includes one or more processors 12, one or more memories 13, and a communication interface (IF) 14.

The processor 12 is, for example, processing circuitry configured to execute various types of software processing. The processing circuitry may include a dedicated hardware circuit (e.g., ASIC) used to process at least part of the software processing. That is, the software processing may be executed in any manner as long as it is executed by processing circuitry that includes at least one of a set of one or more software processing circuits and a set of one or more dedicated hardware circuits.

The processor 12 is, for example, a central processing unit (CPU), a graphics processing unit (GPU), a microprocessor unit (MPU), a field-programmable gate array (FPGA), or any other arithmetic unit. The processor 12 executes a series of instructions included in a program in response to a given signal or when a predetermined condition is satisfied.

The memory 13 is, for example, a random-access memory (RAM) or another type of a volatile memory. The memory 13 is configured to temporarily store programs and data.

The communication IF 14 is configured to connect to the network 15. The communication IF 14 is configured to communicate with other devices connected to the network 15.

Examples of the network 15 include the Internet, a wide area network (WAN), a local area network (LAN), a provider terminal, a wireless communication network, a wireless base station, and a dedicated line. The web server 11 is configured to communicate with the user terminal 16 via the network 15. The user terminal 16 is a device carried by the user. The user terminal 16 may be a mobile device such as a smartphone or a personal computer.

Display System

The service providing system 10 includes a display system 20. The display system 20 includes a display device 21. The display system 20 may include a database 30. The database 30 may be stored in a server device (not shown). The display device 21 is capable of accessing the database 30 via the network 15. The display device 21 may include some or all of the database 30.

The display device 21 includes a display controller 22. The display controller 22 may be a computer including one or more processors 23, one or more memories 24, one or more storage media 25, and a communication interface (IF) 26. The processor 23 may have the same configuration as the processor 12. The memory 24 may have the same configuration as the memory 13. The communication interface 26 may have the same configuration as the communication interface 14.

The storage medium 25 is a non-volatile storage device. The storage medium 25 may be, for example, a read-only memory (ROM), a hard disk drive, or a flash memory. The storage medium 25 may store a program 40.

The display device 21 may include an input device 27 and a display 28. The input device 27 is, for example, a keyboard and a mouse. The input device 27 may include buttons, keys, switches, a touchpad, or a microphone. The display 28 may be, for example, a liquid crystal monitor or an organic electro luminescence (EL) monitor, or may be a touch screen having a touch panel that also serves as the input device 27.

The database 30 stores the time at which a user used each service provided by the web server 11. Specifically, for each service, the database 30 associates user identification information with the time at which the user used the service. For example, when user authentication is executed with user identification information so that the service is accessed, the web server 11 registers, in the database 30, the time at which the user corresponding to the user identification information used the service.

The time at which the user used a service may be when the user used the service for the first time. The definition of the initial use of services may vary depending on the service. The initial use of the service may be agreeing to the terms of use, purchasing products, booking an accommodation or golf course, or making a payment.

The display device 21 is used to display user transitions between multiple services in a display area 29. The display area 29 is, for example, the screen of the display 28. User transitions between multiple services is displayed as a path diagram that indicates the path taken by the user to transition between the services.

Path Diagram

Figure 2:
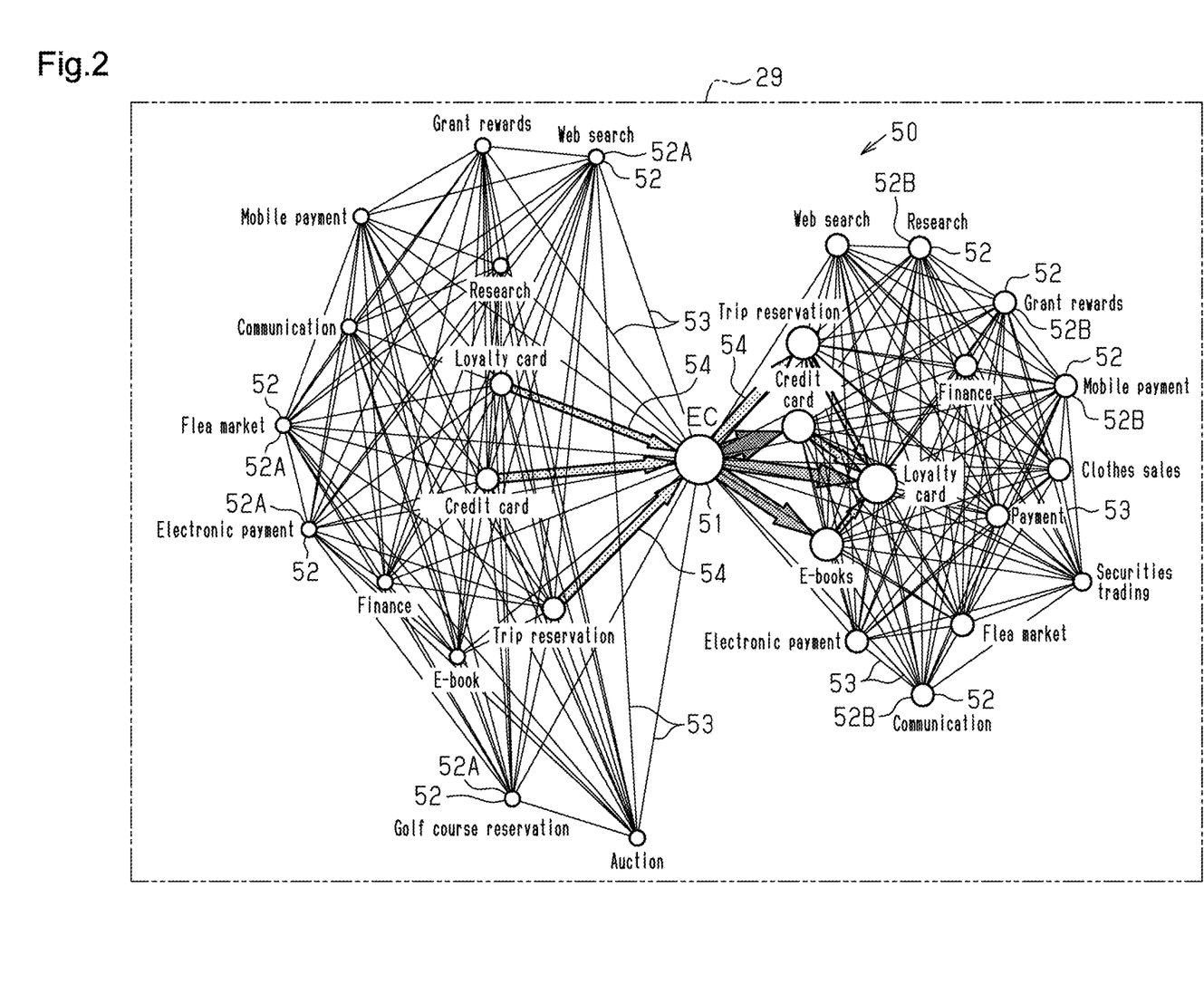
FIG. 2 is a diagram illustrating an example of a path diagram.

As shown in FIG. 2, the path diagram 50 includes nodes 51 and 52. The nodes 51 and 52 respectively correspond to the services provided by the web server 11. The nodes 51 and 52 include one first node 51 and multiple second nodes 52. The first node 51 represents one first service, which serves as the reference among multiple services depicted in the path diagram 50. The second nodes 52 represent second services, other than the first service, among the services. That is, the services include one first service and multiple second services.

The path diagram 50 illustrates user transitions based on the population of users of the first service, which serves as the reference. Accordingly, the path diagram 50 represents which second services the users of the first service used before and after using the first service.

The service name corresponding to the node 51 may be displayed on the display area 29. In the example shown in FIG. 2, the first service is an EC service, whereas the second services are other services including a loyalty card service, a credit card service, and a travel reservation service.

The path diagram 50 includes links 53. Each link 53 represents user transitions between two services. The links 53 may encompass all combinations of the nodes 51 and 52. Each link 53 connects the nodes 51 and 52 to each other. The link 53 connecting the first node 51 to the second node 52 represents user transitions between the first service corresponding to the first node 51 and the second service corresponding to the second node 52. The link 53 connecting two second nodes 52 to each other represents user transitions between the second services corresponding to the two second nodes 52.

Each second node 52 may include a pre-reference second node 52A. The pre-reference second node 52A represents a second service that was used before the first service. Each second node 52 may include a post-reference second node 52B. The post-reference second node 52B represents a second service that was used after the first service. The pre-reference second node 52A and the post-reference second node 52B may each include a different second service.

The first node 51 may be located between the pre-reference second node 52A and the post-reference second node 52B. The pre-reference second node 52A may be located on the left side of the first node 51, and the post-reference second node 52B may be located on the right side of the first node 51. In this case, the user transitions between multiple services from left to right. The pre-reference second node 52A may be located above the first node 51, and the post-reference second node 52B may be located below the first node 51.

The display mode of the nodes 51 and 52 may change in proportion to the number of users of the services corresponding to the nodes 51 and 52. The nodes 51 and 52 to be displayed may become larger as the number of the users of the services corresponding to the nodes 51 and 52 increases. For example, if the nodes 51 and 52 are circular, the diameters of the nodes 51 and 52 may increase as the number of the users of the services corresponding to the nodes 51 and 52 increases. The number of users refers to the number of people who use services. The number of users may refer to the amount of user identification information registered in the database 30 as users of each service.

The display mode of the second node 52 may change in proportion to an overlap ratio. The overlap ratio is the ratio of the number of users of one of two of multiple second services to the number of users who use both of the two second services. As mentioned earlier, the path diagram 50 illustrates user transitions based on the population of users of the first service. Thus, the overlap ratio is calculated from users who use the first service and use two second services. For example, the overlap ratio is the ratio of the number of users of one of the loyalty card service and the credit card service to the number of users who use the first service and use both of the loyalty card service and the credit card service.

The overlap ratio may be based on the service with the smaller number of users. That is, the overlap ratio may be the ratio of the number of users of the second service with the smaller number of users to the number of users of the first service who use both of two second services. For example, if the overlap ratio of one second service with 10,000 users and the other second service with 100 users is calculated and 50 users use both of the two second services, the overlap ratio is 0.5, which is calculated as 50 divided by 100.

The display mode of the second nodes 52 may be changed such that the distance between the second nodes 52 varies in proportion to the overlap ratio. The display mode of the second nodes 52 may be set such that the distance between two second nodes 52, respectively representing two second services with a higher overlap ratio, becomes shorter. In the example shown in FIG. 2, prior to using the EC service, the overlap ratio between the loyalty card service and the credit card service is higher than that between the credit card service and the travel reservation service. The display mode of the second nodes 52 may be changed such that the colors of the second nodes 52 vary in proportion to the overlap ratio. The display mode of the second nodes 52 may be set such that two second nodes 52, respectively representing two second services with a higher overlap ratio, have more closer analogous colors. That is, the display mode of the second nodes 52 should allow the magnitude of the overlap ratio to be visually understandable.

The path diagram 50 may include an upper-level symbol 54. The upper-level 54 indicates the path with a large number of users who have used the first service. The upper-level symbol 54 is, for example, overlaid on the link 53. The upper-level symbol 54 may be an arrow pointing in the direction in which the user has transitioned. The upper-level symbol 54 may be thicker for paths with a greater number of people. The color of the upper-level 54 may change depending on the number of people. For example, the color of the upper-level symbol 54 may become thicker as the number of people increases. The upper-level symbol 54 may display a predetermined number of paths with a large number of people. For example, the upper-level symbols 54 may represent the top ten paths ranked by the number of people. The predetermined number may be set in advance or may be able to be specified using the input device 27.

Display Method

The memory 24 of the display controller 22 is configured to store display data. The display data is used to display the path diagram 50 on the display area 29. The display data is generated based on the database 30. The display data may be generated in advance. In this case, the generated display data may be stored in the storage medium 25 or in a storage medium accessible by the display controller 22. The display data may be generated to display the path diagram 50 on the display area 29.

The display method for displaying user transitions between multiple services on the display area 29 will now be described. The display method is performed by the processor 23 executing the program 40 loaded into the memory 24. The program 40 causes the display controller 22, which is a computer, to execute the following processes.

Figure 3:
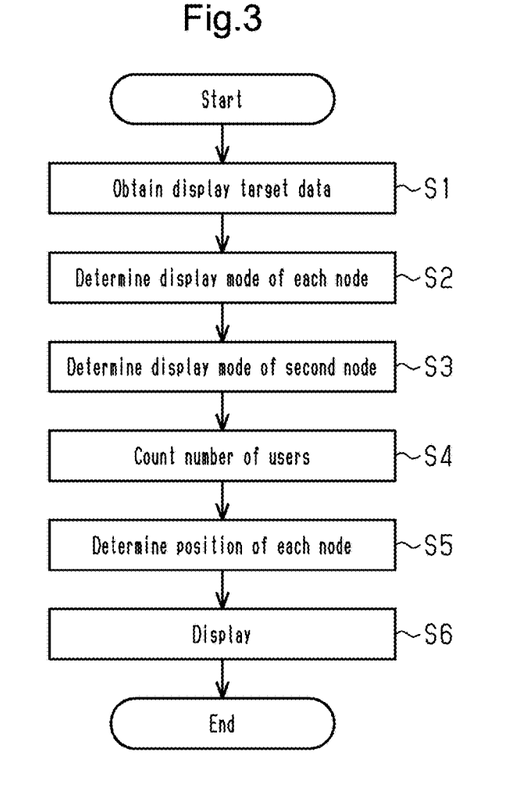
FIG. 3 is a flowchart illustrating the display method of the present embodiment.

As shown in FIG. 3, in step S1, the processor 23 obtains display target data from the database 30. The display target data is used to generate the display data. The displayed target data indicates the times at which each of multiple users used multiple services. The display target data may be data in a specified period. The specified period can be set freely, such as the past month, past year, or the entire period.

Next, in step S2, the processor 23 refers to the number of users to determine the display mode of each of the nodes 51 and 52 that corresponds to a case in which each of the services is treated as the first service. For example, the processor 23 determines the size of each of the nodes 51 and 52. The processor 23 determines the size of each of the nodes 51 and 52 such that they become larger as the number of users increases.

Then, in step S3, the processor 23 refers to the overlap ratio to determine the display mode of the second nodes 52 that corresponds to the case in which each of the services is treated as the first service. For example, the processor 23 determines the distance between the second nodes 52 such that it decreases as the overlap ratio increases. In this case, the processor 23 extracts the second services that each user of the first service is using from the display target data. When the user of the first service is using multiple second services, the processor 23 determines that the user is using each combination of two of the second services. The processor 23 calculates the overlap ratio based on the number of users who are using both of two second services and the number of users of one of the two second services. If the user of the first service is using three or more second services, the processor 23 may calculate the overlap ratio for every combination of two of the three or more the second services. This allows for the calculation of the overlap ratio for each combination of two second services. The processor 23 determines the distance between the second nodes 52 based on the overlap ratio.

Subsequently, in step S4, the processor 23 counts the number of users who followed each path taken by the users who used the first service in the case in which each of the services is treated as the first service.

When the user used multiple second services, before or after using the first service, the processor 23 individually performs a count on each of multiple paths included in the path going through the second services. For example, there may be a case in which the first service is an EC service and the user used the EC service, the credit card service, and then the loyalty card service. In this case, the processor 23 performs a count on the path from the EC service to the credit card service and on the path from the credit card service to the loyalty card service. Further, the processor 23 may perform a count on the path from the EC service to the credit card service and then to the loyalty card service. That is, the path on which the processor 23 performs a count may be between two second services or may include a path between three or more second services.

By performing a count in the above-described manner, the processor 23 obtains the ranking of paths with higher numbers of people in the case in which each of the services is treated as the first service.

Next, in step S5, the processor 23 determines the positions of the nodes 51 and 52 in the case in which each of the services is treated as the first service. The positions of the nodes 51 and 52 are represented by, for example, the coordinates on a orthogonal coordinate system. The position of each second node 52 is represented relative to the first node 51 as the center. The processor 23 determines the position of the second node 52 with the first node 51 as the center. The processor 23 determines the position of the second node 52 in accordance with the distance calculated in step S3. As the number of users of a second service that was immediately before or immediately after using the first service becomes larger, the processor 23 may set the second node 52 corresponding to that second service to a position closer to the first node 51.

Steps S1 to S5 allow the processor 23 to obtain display data. The display data includes the positions and display modes of the nodes 51 and 52 that correspond to the case in which each of the services is treated as the first service. To determine the positions and display modes of the nodes 51 and 52 that correspond to the case in which each of the services is treated as the first service, the processes in steps S2 to S5 should be performed while changing the service that is treated as the first service. As a result, the display data is generated such that the path diagram 50 can be displayed on the display area 29, regardless of which of the services is selected as the first service.

Next, in step S6, the processor 23 displays the path diagram 50, which is based on the display data, on the display area 29. For example, when the input device 27 specifies the first service, the processor 23 displays second nodes 52 with the first node 51 selected as the specified first service, and displays the link 53 between the nodes 51 and 52. The processor 23 may display the upper-level symbol 54 based on the ranking of paths with a large number of people. By displaying the path diagram 50 based on the display data on the display area 29, the processor 23 displays the nodes 51 and 52 on the display area 29 in correspondence with the first service selected from multiple services. The processor 23 changes the display mode of the second node 52 in proportion to the overlap ratio. When the first service selected from multiple services is changed, the processor 23 changes the display modes of the nodes 51 and 52 so as to display the path diagram 50 that is based on the population of users of the first service. For example, the processor 23 changes the display modes of the second nodes 52 so as to display the path diagram 50 that is based on the population of users of the first service.

Detailed View

Figure 4:
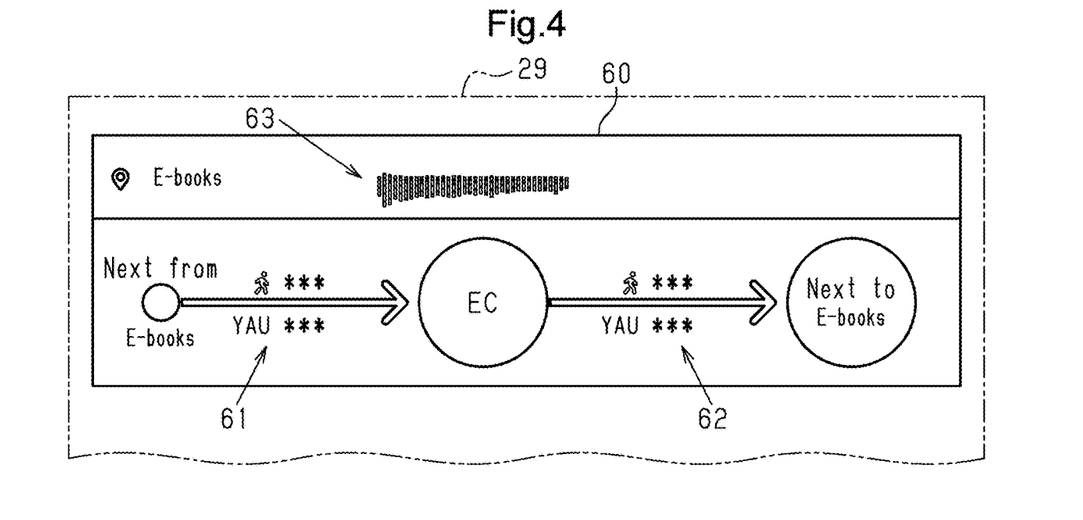
FIG. 4 is a diagram illustrating an example of a detailed view.

The processor 23 may display a detailed view 60 on the display area 29 in response to an operation on the input device 27. The detailed view 60 shows the number of transitions made by a user between multiple services.

As shown in FIG. 4, the detailed view 60 may include a pre-reference user display area 61. The pre-reference user display area 61 shows the number of users who transitioned from the second service to the first service. The pre-reference user display area 61 may show the number of users who transitioned from the second service to the first service during one year. The pre-reference user display area 61 may show the number of users who transitioned from the second service to the first service during one month.

The detailed view 60 may include a post-reference user display area 62. The post-reference user display area 62 shows the number of users who transitioned from the first service to the second service. The post-reference user display area 62 may show the number of users who transitioned from the first service to the second service during one year. The post-reference user display area 62 may show the number of users who transitioned from the first service to the second service during one month.

The second service displayed on the pre-reference user display area 61 may be the same as or different from the second service displayed on the post-reference user display area 62.

The detailed view 60 may include a chart display area 63. The chart display area 63 shows the number of transitions made by the user in the form of a chart. The chart display area 63 may show the number of transitions by the user for a predetermined period (e.g., one month). The chart display area 63 may show the number of users who transitioned from the second service to the first service. The chart display area 63 may show the number of users who transitioned from the first service to the second service.

The detailed view 60 can be displayed on the display area 29 alongside the path diagram 50.

Operation of Present Disclosure

The path diagram 50 displayed on the display area 29 indicates the transitions of users between multiple services. The nodes 51 and 52 each indicate a service. This allows for a visual understanding of user transitions between services.

Advantages of Present Disclosure

The present disclosure has the following advantages.

(1) The processor 23 changes the display mode of each second node 52 in proportion to the overlap ratio. This visually indicates that which users of the second services use the first service. This also visually indicates which second services are used by users of the first service.

(2) The processor 23 displays the nodes 51 and 52 on the display area 29 in correspondence with the first service selected from multiple services. As a result, when multiple services are provided, user transitions based on the population of the users of each service are visually understandable.

(3) The overlap ratio is the ratio of the number of users of one of two second services that has the smaller number of users to the number of users who use both of the two second services. If the difference in the number of users between the two second services is relatively large and the overlap ratio is obtained using the larger number of users, the overlap ratio will be excessively low. This may hinder accurate understanding of user transitions. To solve this problem, the overlap ratio is obtained using the number of users of the second service with the smaller number of users. This allows for correct understanding of user transitions.

(4) Multiple services are provided as at least two of different websites or different applications. This allows for understanding of user transitions between the services provided as different websites or different applications.

(5) As the overlap ratio between two second services increases, the processor 23 shortens the distance between the second nodes 52 that respectively represent the two second services. This facilitates visual understanding of the overlap ratio of the second services.

(6) The first node 51 is located between the pre-reference second node 52A and the post-reference second node 52B. As a result, the nodes 51 and 52 are arranged in the order in which the user transitioned between services. This facilitates visual understanding of user transitions.

(7) The processor 23 displays the detailed view 60 on the display area 29. This allows one to visually understand user transitions through the path diagram 50 and then understand the detailed number of user transitions from the detailed view 60.

Modifications

The present embodiment may be modified as follows. The present embodiment and the following modifications can be combined if the combined modifications remain technically consistent with each other.

First Modification

The overlap ratio may be the ratio of the number of users of one of two second services that has the larger number of users to the number of users who use both of the two second services. In this case, it is preferred that the difference in the number of users between the two second services be relatively small.

Second Modification

Multiple services may each be provided on the same website or the same application. If multiple services are provided on the same website or the same application, the path diagram 50 may represent user transitions between these services. If the website is an EC site, the services may include the sales of products from different categories. For example, there may be a case in which products belonging to a food category, products belonging to a clothes category, and products belonging to a toy category are on sale. In this case, the sales of products belonging to each category may be treated as a single service, and user transitions between the services may be represented using the path diagram 50.

If services are provided on the same website or the same application by multiple business entities, the path diagram 50 may represent user transitions between the services provided by each business entity.

Third Modification

As long as transition between services is understandable from the positional relationship between the nodes 51 and 52, the positions of the nodes 51 and 52 may be changed. For example, if a link 53 is changed to an arrow indicating a direction in which users have transitioned, it will allow one to understand how the users transitioned between the services. In this case, the nodes 51 and 52 may be located at any positions.

Fourth Modification

The display data may be generated by a computer that is different from the display controller 22. In this case, the display controller 22 may obtain the display data generated by the computer to display the path diagram 50 on the display area 29 based on the display data.

Clauses

Concepts that can be understood from each of the above-described embodiment and modifications will now be described.

Clause 1

A display system that displays transitions of users between services accessible using shared user identification information, the display system including:
   one or more processors; and
   one or more memories that store display data, where
   the display data is used to display a path diagram in a display area,
   the path diagram includes:
      nodes respectively corresponding to the services; and
      links representing the transitions of the users between the services, the links each connecting the nodes to each other,
   the nodes include:
      a first node representing a first service that serves as a reference among the services; and second nodes respectively representing second services, other than the first service, among the services, an overlap ratio is a ratio of the number of users of one of two of the second services to the number of users who use both of the two second services, and the one or more processors are configured to, based on the display data, execute:

displaying the path diagram in the display area; and changing a display mode of the second nodes in proportion to the overlap ratio.

Clause 2

A display system that displays transitions of users between services accessible using shared user identification information, the display system including:

one or more processors; and one or more memories that store display data, where the display data is used to display a path diagram in a display area, the path diagram includes:

nodes respectively corresponding to the services; and links representing the transitions of the users between the services, the links each connecting the nodes to each other, the nodes include:

a first node representing a first service that serves as a reference among the services; and second nodes respectively representing second services, other than the first service, among the services, and the one or more processors are configured to, based on the display data, execute:

displaying the path diagram in the display area; and displaying the nodes in the display area depending on the first service selected from the services.

Clause 3

The display system according to clause 1, where the overlap ratio is a ratio of the number of users of one of two of the services having a smaller number of users to the number of users who use both of the two second services.

Clause 4

The display system according to clause 1, where the processor displays the nodes in the display area depending on the first service selected from the services.

Clause 5

The display system according to any one of claims 1 to 4, where the services are provided as at least two of two or more different websites or two or more different applications.

Clause 6

The display system according to any one of claims 1 to 5, where the second nodes include:

a pre-reference second node representing a second service that was used before the first service; and a post-reference second node representing a second service that was used after the first service, and the first node is located between the pre-reference second node and the post-reference second node.

Clause 7

A display method for displaying transitions of users between services accessible using shared user identification information, the display method including causing a computer to display a path diagram in a display area, where the path diagram includes:

nodes respectively corresponding to the services; and links representing the transitions of the users between the services, the links each connecting the nodes to each other, the nodes include:

a first node representing a first service that serves as a reference among the services; and second nodes respectively representing second services, other than the first service, among the services, an overlap ratio is a ratio of the number of users of one of two of the second services to the number of users who use both of the two second services, and the display method comprises causing the computer to change a display mode of the second nodes in proportion to the overlap ratio.

Clause 8

A display method for displaying transitions of users between services accessible using shared user identification information, the display method including causing a computer to display a path diagram in a display area, where the path diagram includes:

nodes respectively corresponding to the services; and links representing the transitions of the users between the services, the links each connecting the nodes to each other, the nodes include:

a first node representing a first service that serves as a reference among the services; and second nodes respectively representing second services, other than the first service, among the services, and the display method comprises causing the computer to display the nodes in the display area depending on the first service selected from the services.

Clause 9

A program that causes one or more computers to display transitions of users between services accessible using shared user identification information, where the services include a first service that serves as a reference and second services other than the first service, the program causes the one or more computers to execute:

acquiring a time at which each of the users used the services;

calculating an overlap ratio, the overlap ratio being a ratio of the number of users of one of two of the second services to the number of users who use both of the two second services;

displaying a first node in a display area, the first node representing the first services;

displaying second nodes in the display area, the second nodes respectively representing the second services;

displaying links in the display area, the links representing the transitions of the users between the services, wherein the links include links connecting the first node to the second nodes and links connecting the second nodes to each other; and changing a display mode of the second nodes in proportion to the overlap ratio.

Clause 10

A program that causes one or more computers to display transitions of users between services accessible using shared user identification information, where the services include a first service that serves as a reference and second services other than the first service, the program causes the one or more computers to execute:

acquiring a time at which each of the users used the services;

determining a display mode of a first node and second nodes, wherein the first node represent the first service when each of the services is used as the first service, and the second nodes respectively represent the second services;

displaying the first node in a display area;

displaying the second nodes in the display area;

displaying links in the display area, the links representing the transitions of the users between the services, wherein the links include links connecting the first node to the second nodes and links connecting the second nodes to each other; and displaying the first node and the second nodes in the display area depending on the first service selected from the services.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A display system that displays transitions of users between services accessible using shared user identification information, the display system comprising:

one or more processors; and one or more memories storing computer program code and display data, wherein the display data is used to display a path diagram in a display area, the path diagram includes:

nodes respectively corresponding to the services; and links representing the transitions of the users between the services, the links each connecting the nodes to each other, the nodes include:

a first node representing a first service that serves as a reference among the services; and second nodes respectively representing second services, other than the first service, among the services, an overlap ratio is a ratio of the number of users of one of two of the second services to the number of users who use both of the two second services, and the one or more processors are configured to read the program code and operate as instructed by the program code, the program code comprising:

path diagram display code configured to cause at least one of the one or more processors to display the path diagram in the display area based on the display data; and change code configured to cause at least one of the one or more processors to change a display mode of the second nodes in proportion to the overlap ratio.

2. The display system according to claim 1, wherein the overlap ratio is a ratio of the number of users of one of two of the services having a smaller number of users to the number of users who use both of the two second services.

3. The display system according to claim 1, wherein the program code further comprises node display code configured to cause at least one of the one or more processors to display the nodes in the display area depending on the first service selected from the services.

4. The display system according to claim 1, wherein the services are provided as at least two of two or more different websites or two or more different applications.

5. The display system according to claim 1, wherein the second nodes include:

a pre-reference second node representing a second service that was used before the first service; and a post-reference second node representing a second service that was used after the first service, and the first node is located between the pre-reference second node and the post-reference second node.

6. A display system that displays transitions of users between services accessible using shared user identification information, the display system comprising:

one or more processors; and one or more memories storing computer program code and display data, wherein the display data is used to display a path diagram in a display area, the path diagram includes:

nodes respectively corresponding to the services; and links representing the transitions of the users between the services, the links each connecting the nodes to each other, the nodes include:

a first node representing a first service that serves as a reference among the services; and second nodes respectively representing second services, other than the first service, among the services, and the one or more processors are configured to read the program code and operate as instructed by the program code, the program code comprising:

path diagram display code configured to cause at least one of the one or more processors to display the path diagram in the display area based on the display data; and node display code configured to cause at least one of the one or more processors to display the nodes in the display area depending on the first service selected from the services.

7. The display system according to claim 6, wherein the services are provided as at least two of two or more different websites or two or more different applications.

8. The display system according to claim 6, wherein the second nodes include:
- a pre-reference second node representing a second service that was used before the first service; and
- a post-reference second node representing a second service that was used after the first service, and the first node is located between the pre-reference second node and the post-reference second node.

9. A display method for displaying transitions of users between services accessible using shared user identification information, the display method comprising causing a computer to display a path diagram in a display area, wherein
the path diagram includes:
- nodes respectively corresponding to the services; and
- links representing the transitions of the users between the services, the links each connecting the nodes to each other, the nodes include:
- a first node representing a first service that serves as a reference among the services; and
- second nodes respectively representing second services, other than the first service, among the services, an overlap ratio is a ratio of the number of users of one of two of the second services to the number of users who use both of the two second services, and the display method comprises causing the computer to change a display mode of the second nodes in proportion to the overlap ratio.

* * * * *